April 14, 1931.  A. BUQUOR ET AL  1,800,675
WHEEL ATTACHMENT FOR VEHICLES
Filed Sept. 24, 1928  2 Sheets-Sheet 1

INVENTOR.
Adolph Buquor &
Harry Y. Stebbins
BY Westall and Wallan
ATTORNEYS

INVENTOR.
Adolph Buquor &
Harry Y. Stebbins
BY Nestall and Wallace
ATTORNEYS

Patented Apr. 14, 1931

1,800,675

UNITED STATES PATENT OFFICE

ADOLPH BUQUOR AND HARRY Y. STEBBINS, OF LOS ANGELES, CALIFORNIA, ASSIGNORS TO THE OHIO STATE BANK & TRUST COMPANY, OF AKRON, OHIO, A CORPORATION OF OHIO

WHEEL ATTACHMENT FOR VEHICLES

Application filed September 24, 1928. Serial No. 307,803.

This invention relates to an attachment for running gears of vehicles and is especially adapted for converting four wheel vehicles into six wheel, although it may be employed for coupling a set of wheels to another set by means providing for independent equalization of pairs of wheels on opposite sides of the vehicle frame. The objects of this invention are to provide wheel attachment means having any or all of the following features: supporting rockers or springs, each carrying at one end a traction wheel; attachment means for each rocker serving as a bearing for pivotally mounting the rockers intermediate their ends and independent of one another, said attachment means having mountings for journalling wheels thereon and acting as a radius arm. In addition to the broader objects of this invention it is a further object to provide a simple, durable attachment, economical to manufacture and adapted for ready and expeditious conversion of a well known type of four wheel motor vehicle into a six wheel motor vehicle.

Figure 1:
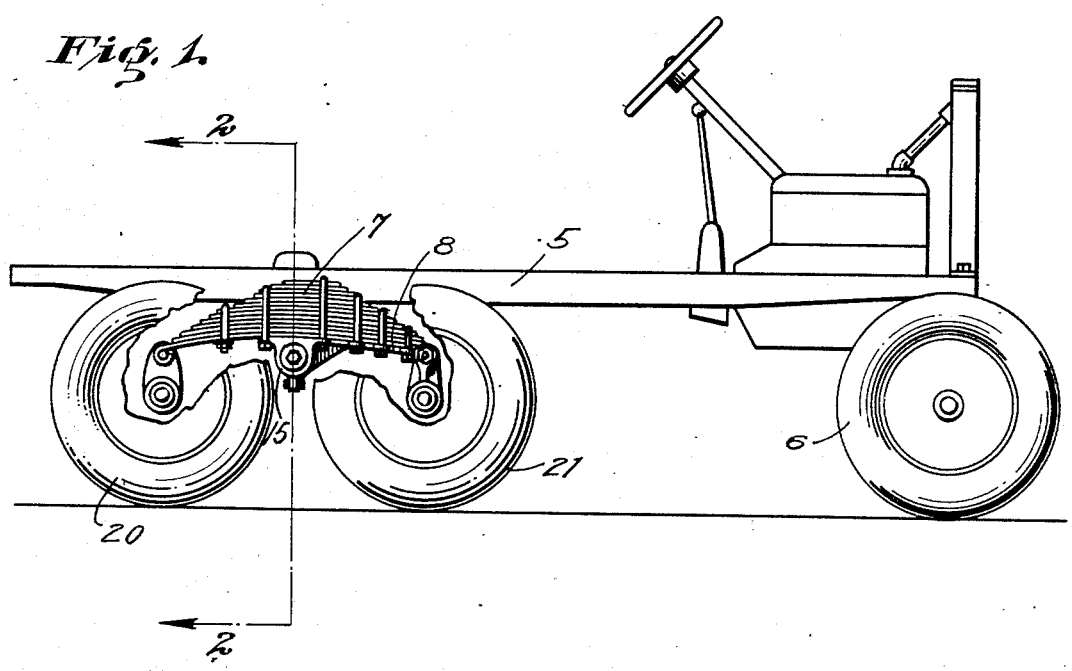
Figure 2:
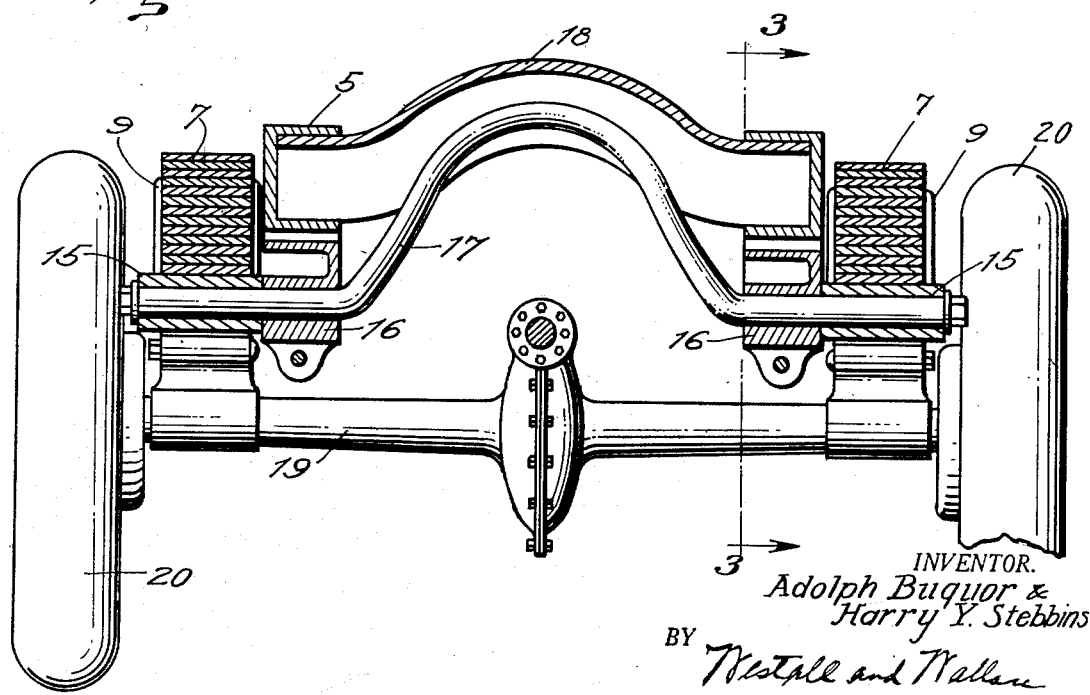
Figure 4:
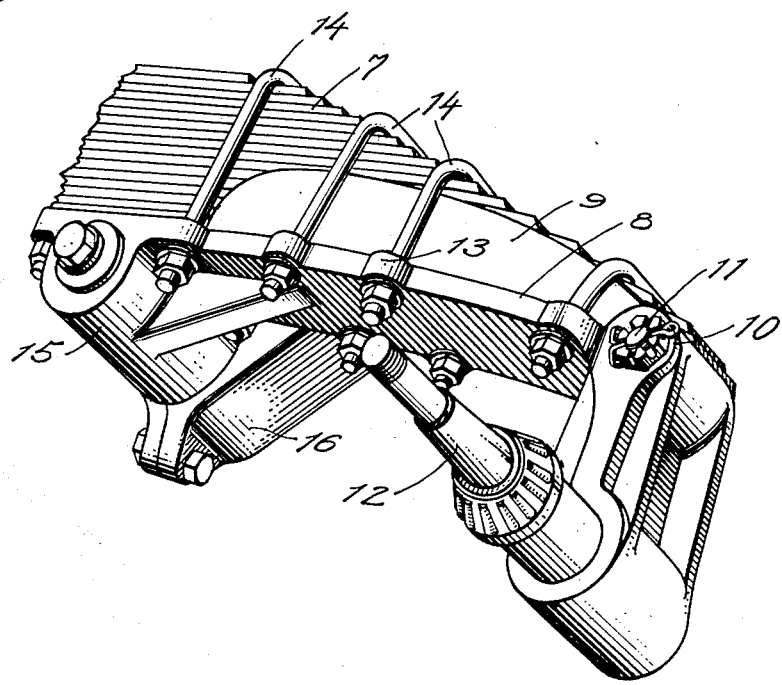
Figure 3:
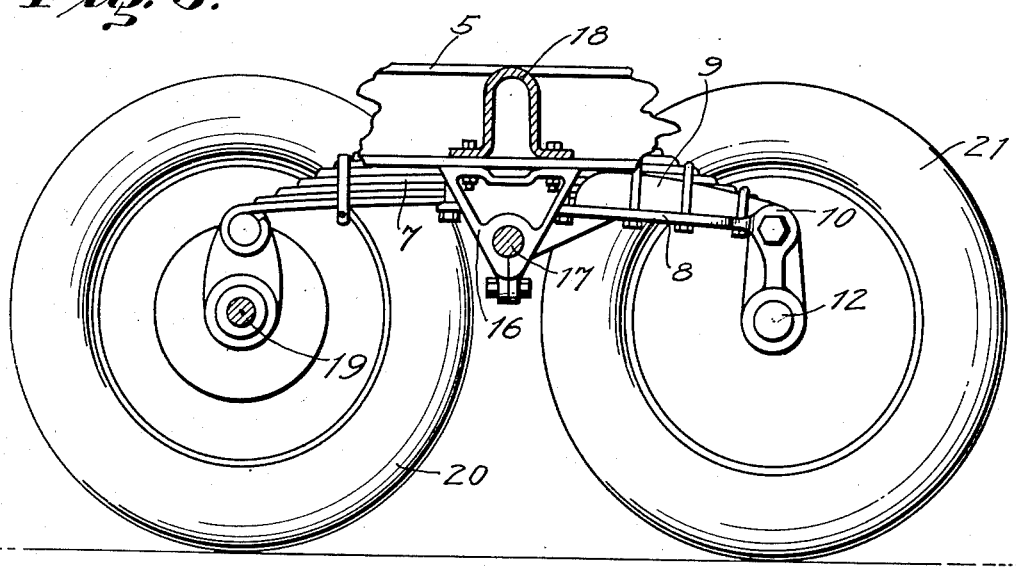

These objects together with other objects and corresponding accomplishments are obtained by means of the embodiment of our invention illustrated in the accompanying drawings, in which:

Fig. 1 is a side elevation of a motor vehicle having our invention incorporated therein, parts being broken away to show a spring with an attachment mounted thereon; Fig. 2 is a section as seen on the line 2—2 of Fig. 1 on an enlarged scale; Fig. 3 is a section as seen on the line 3—3 of Fig. 2; and Fig. 4, is a perspective view of the attachment mounted upon a spring, a fragment of the spring being shown.

Referring with more particularity to the drawings, the chassis frame is indicated by 5. The vehicle is shown with the usual front wheels marked 6 and sets of rear wheels on opposite sides of the frame. These rear wheels comprise a pair at each side of the frame.

Leaf springs 7 are secured to supporting members each comprising a radius arm 8 extending longitudinally along its spring from a point intermediate its ends to the forward or outer end. The arm has side walls extending upwardly so as to provide a seat 9 for the spring leaves. At the outer end are lugs 10 having bolt holes registering with the usual eye in the spring and receiving a bolt 11 for securing the spring and attachment together. Depending from the outer end of the arm is a stub axle 12 for mounting thereon of a traction wheel. Projecting laterally from the arm are lugs 13 for spring clips 14 to firmly secure the spring and attachment together. A bearing bracket 15 depends from the inner end of the attachment to receive the end of a shaft securing the spring and bracket to the frame of the vehicle.

Mounted upon the side bars of the frame are brackets 16 supporting a shaft 17. Shaft 17 is arched and disposed in a cross channel 18 on the frame of the vehicle. Secured to the rear end of the springs in the usual manner is a drive axle 19 carrying wheels 20. Wheels 21 are mounted upon the stub axles 12.

The construction is such that the springs serve as rockers pivoting upon the shaft 17 and distribute the load between wheels 20 and 21 of a pair accommodating themselves to obstructions and irregularities in the road. The arms 8 are rigid and serve as radius arms to hold the rear wheels in proper position and relieve the springs of stresses caused by the rear wheels following the frame of the vehicle. The construction is such that the springs of a standard four wheel motor vehicle may be employed and the vehicle converted to a six wheel type by employing the axle 17, brackets 16 and the attachments.

What we claim is:

1. An attachment adapted for pivotally mounting leaf springs on supporting shafts comprising a radius arm having a bracket bearing at one end journalled on a supporting shaft, upstanding lugs at the other end with registering bolt openings and a stub shaft projecting laterally from the other end.

2. An attachment adapted for pivotally mounting leaf springs on supporting shafts comprising a radius arm having a channel spring seat extending longitudinally thereof, a bracket bearing at one end journalled on a supporting shaft and a stub shaft projecting laterally from the other end.

3. An attachment adapted for pivotally mounting leaf springs on supporting shafts comprising a radius arm having a channel spring seat extending longitudinally thereof, a bracket bearing at one end journalled on a supporting shaft, upstanding lugs at the other end with registering bolt openings and a stub shaft projecting laterally from the other end.

4. An attachment adapted for leaf springs comprising an arm having a channel spring seat extending longitudinally thereof, a bracket bearing depending from said arms at one end, a stub shaft projecting laterally from the other end, lugs projecting laterally from the sides of said arm and having openings, and spring clips for said openings.

5. An attachment adapted for leaf springs comprising an arm having a channel spring seat extending longitudinally thereof, a bracket bearing depending from one end thereof, upstanding lugs at the other end with registering bolt openings, a stub shaft projecting laterally from said other end, lugs projecting laterally from said arm and having openings for spring clips.

In witness that we claim the foregoing we have hereunto subscribed our names this 10th day of September, 1928.

ADOLPH BUQUOR.
HARRY Y. STEBBINS.